United States Patent [19]

Ferrero et al.

[11] Patent Number: 4,700,042
[45] Date of Patent: Oct. 13, 1987

[54] DEVICE FOR CONTROLLING ELECTRICAL RESISTANCE WELDING APPARATUS, PARTICULARLY FOR CONTROLLING APPARATUS FOR WELDING PARTS OF MOTOR VEHICLES BODIES

[75] Inventors: Mario Ferrero, Turin; Paolo Coppa, Orbassano; Osvaldo Salvatore, Turin, all of Italy

[73] Assignee: Fiat Auto S.p.A., Turin, Italy

[21] Appl. No.: 800,235

[22] Filed: Nov. 21, 1985

[30] Foreign Application Priority Data

Nov. 26, 1984 [IT] Italy .............................. 68174 A/84

[51] Int. Cl.⁴ ............................................ B23K 11/24
[52] U.S. Cl. ................................. 219/110; 219/114
[58] Field of Search ................. 219/108, 109, 110, 114

[56] References Cited

U.S. PATENT DOCUMENTS

| | | | |
|---|---|---|---|
| 3,546,421 | 12/1970 | Meyer et al. | 219/110 |
| 3,932,725 | 1/1976 | Ganowski | 219/110 |
| 4,076,974 | 2/1978 | Gee | 219/114 |
| 4,577,086 | 3/1986 | Needham et al. | 219/109 |

FOREIGN PATENT DOCUMENTS

60-6751   2/1985   Japan .................................. 219/110

*Primary Examiner*—Clifford C. Shaw
*Attorney, Agent, or Firm*—Sughrue, Mion, Zinn, Macpeak, and Seas

[57] ABSTRACT

In electrical resistance welding apparatus comprising two welding electrodes connected through respective supply cables to an electrical power supply which can generate welding current with selectively-variable effective values, a control device is provided which, in use of the apparatus, measures the resistance between the electrodes clamped on the pieces which are being welded and the resistance between the ends of the supply cables. During welding, the device detects the change in the resistance between the electrodes with time and, on the basis of a linear combination of several parameters of the resistance curve detected, establishes whether the spot weld effected should be considered acceptable or unacceptable. In the latter case, the control device causes the welding operation to be continued with a current having a higher, rms value so as to correct the spot weld made. A statistical analysis is carried out on the spots considered acceptable so as to effect, in dependence on the results of this analysis, gradual increases in the duration of the activation intervals (welding angle) of the electrical power supply so as to compensate for the attrition of the electrodes. A gradual increase in the duration of the activation intervals of the electrical power supply is also effected upon an increase in the resistance detected between the ends of the supply cables in order to compensate for the wear of the cables themselves. Once the possibility of correction has been exhausted, the device indicates to the exterior the need to replace the electrodes and/or the supply cables.

3 Claims, 5 Drawing Figures

DEVICE FOR CONTROLLING ELECTRICAL RESISTANCE WELDING APPARATUS, PARTICULARLY FOR CONTROLLING APPARATUS FOR WELDING PARTS OF MOTOR VEHICLES BODIES

The present invention relates to devices for controlling electrical resistance welding apparatus and is particularly concerned with a device for use in controlling welding apparatus comprising:

first and second welding electrodes for cooperating with each other in use, with the interposition of pieces to be welded, an electrical power supply having regulating means and able to supply electrical welding currents whose rms value can be regulated by the regulating means, and first and second supply cables connecting the electrical power supply to the first electrode and the second welding electrode respectively.

Electrical resistance welding apparatus of the type specified above is currently used in industry, particularly for welding parts of motor vehicle bodies.

Such apparatus normally has associated control devices which compensate for the effects that several accidental phenomena—such as, the shunt effect, variations in the mains voltage, the introduction of different electromagnetic masses between the welding electrodes, and accidental contacts between the pieces which are welded and the electrodes outside the welding zone—may have on the quality and reliability of the welds obtained.

It is also well known that the gradual wear particularly the increase in the end diameter, of the welding electrodes causes a corresponding qualitative deterioration in the result of the welding operation.

For this reason, it is necessary to replace the electrodes in the apparatus periodically.

The object of the present invention is to provide an improved control device which enables the influence of the gradual deterioration of the electrodes and other components of the welding apparatus to be detected and compensated for precisely and reliably.

According to the present invention, this object is achieved by a control device which can be used together with welding apparatus of the type specified above, characterised in that it includes:

first and second voltage detector probes applied to the first and second welding electrodes respectively, third and fourth voltage detector probes applied respectively to the first supply cable and the second supply cable in their regions of connection to the electrical power supply, a current sensor sensitive to the magnitude of the welding current supplied by the electrical power supply, and a processing circuit connected to the first, second, third and fourth voltage detector probes, to the current sensor and to the regulating means of the electrical power supply, which, from the voltages detected by the probes and the magnitude of the current detected by the current sensor, can generate signals indicative of the resistances between the first and the second welding electrodes and between the ends of the first and the second supply cables in use of the apparatus, the processing circuit including threshold elements which can compare the signals indicative of the resistances with respective threshold values and can act on the regulating means of the electrical power supply to effect a variation in the rms value of the welding current supplied by the supply itself when at least one of the signals indicative of the resistances reaches the respective threshold value.

By virtue of this characteristic, a control device is provided for welding apparatus in which the gradual wear of the welding electrodes is monitored and compensated for in a coordinated manner. A similar monitoring and compensating action is carried out in relation to the wear of the supply cables. The coordinated monitoring of the wear of the electrodes and cables allows, among other things, the avoidance of the premature replacement of only partly worn welding electrodes when the qualitative deterioration of the welding operation should in fact be attributed to excessive deterioration of the supply cables, and vice versa. This possibility for the precise monitoring of the progress of the wear is of particular importance if account is taken of the considerable cost of replacement and renewal of the components concerned.

According to a preferred embodiment, the processing circuit includes a counter unit which can detect, over a cycle of successive welding operations, the number of welding operations in which the signal indicative of the resistance between the first and second welding electrodes reaches the respective threshold value and, when the number of operations reaches a predetermined value, can command a permanent increase in the rms value of the welding current supplied by the electrical power supply.

Figure 1:
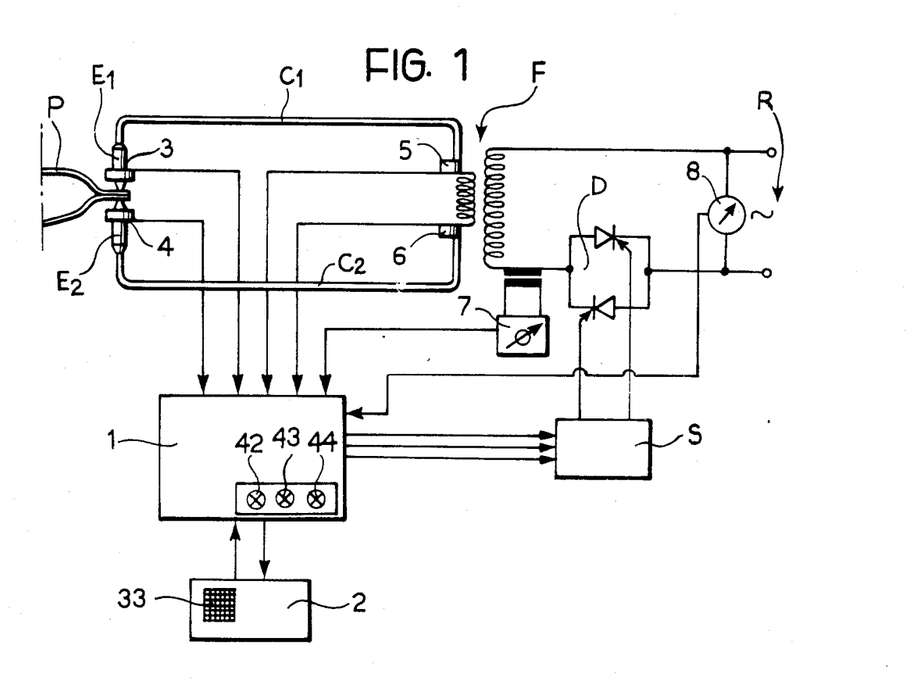
FIG. 1 is a block schematic diagram of the structure of electrical resistance welding apparatus provided with a control device according to the invention.

The invention will now be described, purely by way of non-limiting example, with reference to the appended drawings, in which:

FIG. 1 illustrates schematically the structure of electrical resistance welding apparatus.

In known manner, the apparatus includes, as essential elements:

first and second electrodes $E_1$ and $E_2$ together defining a welding yoke for gripping metal pieces P for welding, an electrical power supply generally constituted by a transformer F the primary winding of which is connected to the mains supply R, and first and second supply cables, indicated $C_1$ and $C_2$ respectively, each of which connects one of the electrodes $E_1$, $E_2$ to one of the ends of the secondary winding of the transformer F.

In use of the apparatus, the transformer F supplies welding currents i through its secondary winding to the circuit defined by the supply cable $C_1$, $C_2$, the electrodes $E_1$, $E_2$ and the pieces P to be welded gripped between these electrodes.

The regions of the pieces P through which the welding current i flows are heated and melt to result in the formation of a nucleus of fused metal (spot) which, after solidification, constitutes a welded element between the pieces P.

The rms value of the welding currents i supplied by the transformer F varies in dependence on the signals generated by the regulating unit S.

The unit S acts on electronic switches D, shown schematically here as two SCR diodes which selectively control the supply of the electrical current from the mains to the primary winding of the transformer F. More particularly, and according to criteria well known to experts in the art, the electronic switches D are able selectively to control the duration of the periods for which the supply circuit of the primary winding of the transformer F is rendered conductive (operating angle).

Figure 2:
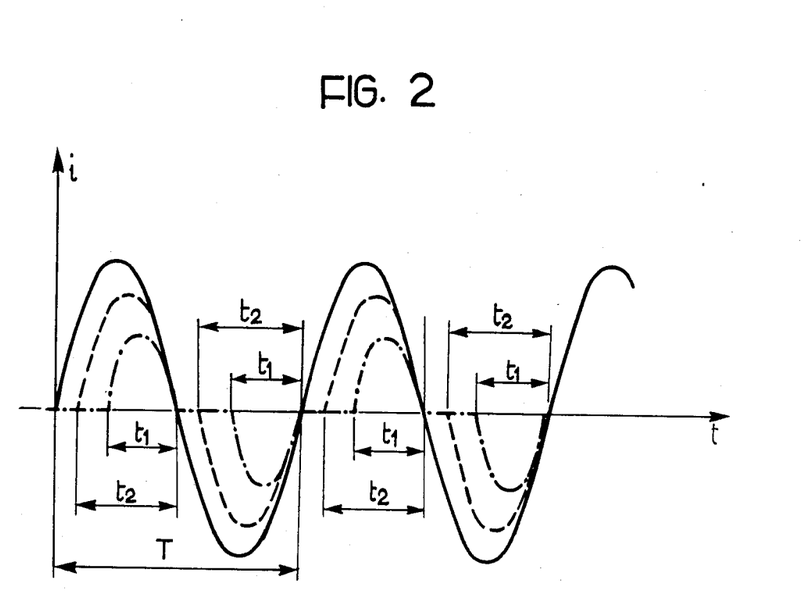
FIG. 2 illustrates the possible changes in an electrical signal generated within the apparatus of FIG. 1.

The effect of the regulating action exerted by the unit S on the welding current i is shown schematically in the graph of FIG. 2.

In this graph, the scale on the abscissa corresponds to the temporal evolution of the welding current i, the amplitude or magnitude of which is indicated on the ordinate scale.

Purely by way of example, FIG. 2 relates to welding apparatus in which the currents supplied by the transformer F are alternating currents with a period T.

FIG. 2 illustrates how it is possible, by varying the duration of the periods for which the supply circuit for the primary winding of the transformer F is rendered conductive, to vary the rms value of the welding current i.

For example, starting from a condition in which the switches D are rendered conductive and supply the primary winding of the transformer F for two identical periods $t_1$ during each period T (the chain line in FIG. 2), a condition can be attained in which the duration of the conductive periods of the switches D changes to a value $t_2$ with $t_2 > t_1$ (the broken lines in FIG. 2).

From this latter condition, one may then progress to a condition of use (not explicitly illustrated) in which the switches D are rendered conductive for periods of time of a duration $t_3$ with $t_3 > t_2$, and then to a condition in which the switches D are conductive for periods of a duration $t_4$ with $t_4 > t_3$, and so on until, through successive increments, a final condition is reached in which the duration of the conductive periods of the switches D is equal to T/2: in this condition, the primary winding of the tranformer F is supplied with the sinusoidal wave form of the current supplied by the mains.

As is well known to experts in the field, other parameters being equal, there is a univocal relationship between the variation in the conductive time $t_1$, $t_2$, $t_3$, etc. of the switches D and the rms value of the current i which increases as the duration of the conductive periods of the switches D increase.

It should also be mentioned that FIG. 2 relates to a current i of alternating type for simplicity of illustration and purely by way of example. In practice, wave forms of different types are frequently used, for example of rectified double-half-wave type. However, in general, one is dealing with waveforms of a periodic type for which an effective value or rms value is univocally defined.

Returning to FIG. 1, a control device, generally indicated 1, acts on the regulating unit S and is provided with a control and input panel, indicated 2, for the welding parameters.

The control device 1 has associated sensors through which the device 1 receives information on the operating conditions of the welding apparatus.

In particular, four voltage detector probes, indicated progressively 3-6, are mounted on the electrodes $E_1$, $E_2$ and on their respective supply cables $C_1$, $C_2$. Reference 7, however, indicates a current sensor associated with the primary winding of the transformer F.

More precisely, the detecting probe 3 is mounted on the first welding electrode $E_1$ while the probe 4 is mounted on the other electrode $E_2$.

The probe 5, however, is mounted on the cable $C_1$ which supplies the first electrode $E_1$ at its the region of connection of the cable to the secondary winding of the transformer F.

Finally, the probe 6 is mounted on the cable $C_2$ which supplies the electrode $E_2$ at its region of connection to the secondary winding of the transformer F.

Thus, the assembled arrangement of the probes 3-6 is such that in use, at least for small constants of calibration;

the voltage difference detectable between the probes 3 and 4 corresponds to a voltage drop across the electrodes $E_1$, $E_2$ and the pieces P interposed between them during the welding operation, the voltage difference detectable between the probe 5 and the probe 3 corresponds to the voltage drop between the ends of the first supply cable $C_1$, and the voltage difference detectable between the probe 4 and the probe 6 corresponds to the voltage drop between the ends of the second supply cable $C_2$.

The current sensor 7 enables the (instantaneous) magnitude of the current flowing through the primary winding of the transformer F to be detected. From a knowledge of the transformation ratio of the transformer F itself, the current sensor 7 enables the instantaneous value of the welding current supplied by the secondary winding of the transformer F to the electrodes $E_1$ and $E_2$ to be determined immediately.

Consequently, even though the current sensor 7 is mounted on the primary winding for practical reasons, in the following part of the present description and in the claims, it will in fact be described as a sensor which can detect the magnitude of the welding current i supplied by the electrical power supply constituted by the transformer F.

Finally, a voltage sensor which can detect the voltage present in the mains supply R is indicated 8.

The voltage sensor is connected to one or more monitoring units incorporated in or associated with the circuit 1 which allow the progress of the welding operation to be changed so as to compensate for the variations in the supply voltage of the apparatus. These additional monitoring units are of generally known type and therefore will not be described in detail.

Figure 3:
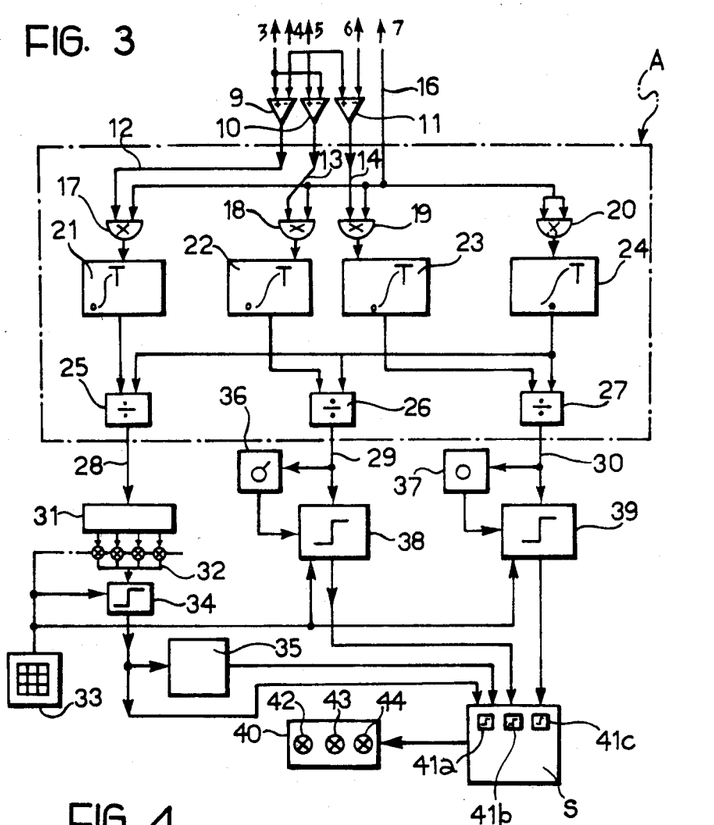
FIG. 3 is a block schematic diagram illustrating the structure of one of the elements indicated in FIG. 1.

Turning now to the block schematic diagram of the device 1 illustrated in FIG. 3, three substractor or difference circuits, indicated 9, 10 and 11, have two inputs and respective outputs, indicated 12, 13, and 14.

More particularly, the inputs of the circuit 9 are connected to the voltage detector probes 3 and 4 while the inputs of the circuit 10 are connected to the probes 5 and 3. The inputs of the circuit 11, however, are connected to the probes 4 and 6.

If account is taken of the assembled arrangement of the probes, the lines 12, 13 and 14 carry respectively:

a signal corresponding to the instantaneous value of the voltage drop between the electrodes $E_1$, $E_2$ and the pieces P clamped between them (line 12), a signal corresponding to the instantaneous value of the voltage drop across the ends of the first supply cable $C_1$ (line 13), and a signal corresponding to the instantaneous value of the voltage drop between the ends of the second supply cable $C_2$ (line 14).

A further signal corresponding to the instantaneous value of the magnitude of the welding current i supplied by the transformer F to the electrodes $E_1$, $E_2$, however, is present on the line 16 which connects the device 1 to the current sensor 7.

Four multiplier circuits of analog or preferably digital type are indicated 17–20, each of which has two inputs and an output to which a respective integrator circuit is connected.

The integrator circuits, indicated with progressively references 21–24, may also be of analog or preferably digital type like the multiplier circuits 17–20.

The progressive references 25–27 indicate divider circuits which may also be of analog or preferably digital type and which are connected to the outputs of the integrator circuits 21–24 according to criteria which will be explained more fully below.

Figure 4:
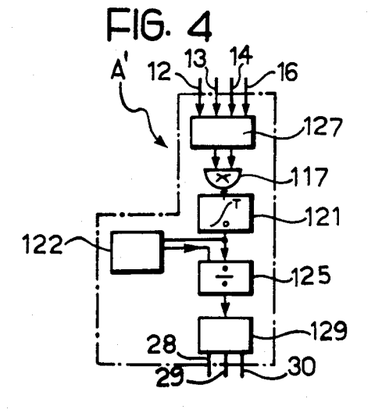
FIG. 4 is another block schematic diagram illustrating a possible variant of a part of the diagram of FIG. 3.

Naturally, when digital type circuits are used for the multiplier circuits 17–20, the integrator circuits 21–24 and the divider circuits 25–27, analog/digital convertor circuits, not explicitly illustrated in the diagram of FIG. 4, are disposed downstream of the subtractor circuit 9–11.

If the diagrammatic connections of these components are studied in greater detail, it may be seen that the lines 12 and 16 are connected to the multiplier circuit 17–20 to which the integrator circuit 21 is connected, while the lines 13 and 16 are connected to the multiplier circuit 18 whose output is connected the integrator circuit 22. The lines 14 and 16 are connected to the multiplier circuit 19 whose output is connected to the integrator circuit 23.

The two inputs of the multiplier circuit 20 whose output is connected to the integrator circuit 24 are both connected to the line 16. The purpose of the multiplier circuit 20 is thus to calculate the square of the signal present on the line 16 itself.

Each of the integrator circuits 21–24 integrates the respective input signal, calculating the integral of the respective input signal for each period (of duration T) of the welding current i.

From a dimensional point of view, the signals which are supplied to the integrator circuits 21–23 correspond to the product of the voltage signal (signals present on the lines 12, 13 and 14) and a current signal (signal present on the line 16). The signal supplied to the input of the integrator circuit 24, however, corresponds dimensionally to the square of a current.

The signal generated by the integrator circuit 24 is transmitted as a denominator to all three divider circuits 25, 26 and 27.

As dividends, there are supplied to these circuits the signal generated by the integrator circuit 21, the signal generated by the integrator circuit 22, and the signal generated by the integrator circuit 23 respectively.

Thus, at the outputs of the divider circuits 25, 26 and 27, indicated respectively 28, 29 and 30, are generated, for each cycle of the welding current supplied by the transformer F, signals corresponding to a magnitude $R_m$ which can be expressed in the form:

$$R_m = \frac{\int_O^T V(t) \cdot i(t)\, dt}{\int_O^T i^2(t)\, dt} \qquad (I)$$

where the signal i (t) corresponds to the instantaneous magnitude of the welding current i (the signal on the line 16) and the symbol $$\int_O^T$$

corresponds to the integrating operation carried out on the period T of the current itself.

The term v(t), however, corresponds respectively:

in the case of the divider circuit 25, to the instantaneous value of the voltage drop across the electrodes $E_1$, $E_2$ clamped on the pieces P subjected to welding, in the case of the divider circuit 26, to the instantaneous value of the voltage drop between the ends of the first supply cable $C_1$, and in the case of the divider circuit 27, to the instantaneous value of the voltage drop between the ends of the second supply cable $C_2$.

The magnitude $R_m$ present (obviously with different values) on the lines 28, 29 and 30 thus corresponds dimensionally to an average value of purely ohmic resistance in that the integrating operation eliminates the inductive components of the magnetic field associated with the secondary winding of the transformer F linked to the measurement circuit.

Thus, an average resistance is present in the line 28 which corresponds to the electrical resistance between the electrodes $E_1$, $E_2$ clamped on the pieces P subjected to welding, while the signals present on the lines 29 and 30 correspond respectively to the average resistances measured between the ends of the first supply cable $C_1$ and the second supply cable $C_2$.

For simplicity of explanation, reference is made to a circuit diagram in which, to calculate the magnitudes $R_m$ present on the lines 28, 29 and 30, there are used:

four multiplier circuits 17–20 for calculating the products v(t).i(t) and $i^2(t)$, four separate integrator circuits (21–24) for calculating the denominator and the different numerators of the equation (I) quoted above, and three separate divider circuits (25–27) for calculating the equation (I) in relation to the electrodes $E_1$, $E_2$ and the two supply cables $C_1$, $C_2$.

Naturally, the assemblage of circuits indicated schematically by A in FIG. 3 may be replaced by a simpler circuit such as that indicated A' in FIG. 4. In this latter circuit, use is made of a single multiplier circuit 117 with two inputs and an output connected to an integrator circuit 121 whose output is connected in turn to a single divider circuit 125 with the interposition of a buffer memory 122.

Upstream of the multiplier circuit 117 is a multiplexer circuit 127 connected to the lines 12, 13, 14 and 16.

The function of the multipleier circuit 127 is to supply to the inputs of the multiplier circuit 117, at different instants (according to a general time division scheme):

the signal present on the line 12 and the signal present on the line 16, the signal present on the line 13 and the signal present on the line 16, the signal present on the line 14 and the signal present on the line 16, and finally, the signal present on the line 16 duplicated at both the inputs of the multiplier circuit 117.

In the four operational conditions described, the multiplier circuit 117 performs the functions carried out by the multiplier circuit 17, the multiplier circuit 18, the multiplier circuit 19, and the multiplier circuit 20, respectively, in the diagram of FIG. 3.

In an entirely similar manner, the integrator circuit 121, carries out, in succession, the functions performed by the integrator circuit 21, the integrator circuit 22, the integrator circuit 23 and the integrator circuit 24.

The function of the memory 122 is to store temporarily one of the signals calculated by the integrator circuit 121 corresponding to the denominator or one of the numerators of the equation (I), while the integrator circuit 121 calculates the corresponding denominator or numerator.

The denominator and the numerator of the equation (I) provided in this way are then applied to the inputs of the circuit 125 which performs, in succession, the functions which are carried out by the divider circuit 25, the divider circuit 26 and the divider circuit 27 in the scheme of FIG. 4.

A demultiplexer circuit 129 connected to the output of the divider circuit 125 then distributes the corresponding magnitudes $R_m$ calculated from the equation (I) to the lines 28, 29, 30.

The variant illustrated in FIG. 4 may be further simplified if one forgoes the almost simultaneous obtention of the information relating to the resistances between the electrodes $E_1$, $E_2$ and between the ends of the supply cables $C_1$, $C_2$.

For example, one could consider monitoring the resistances in cyclic alternation, monitoring first (for example, during the welding of one side of a motor vehicle) only the resistance between the electrodes $E_1$, $E_2$ and the monitoring (for example, during welding of a second and a third side) the resistance between the ends of the cable $C_1$ and the resistance across the ends of the second supply cable $C_2$, finally returning to monitor the resistance between the electrodes $E_1$, $E_2$ and so on in a cyclic sequence.

In general, each individual welding operation (the application of one spot) involves the supply (energisation) of the electrodes $E_1$, $E_2$ for a predetermined number of periods (for example 8) of the welding current i.

Figure 5:
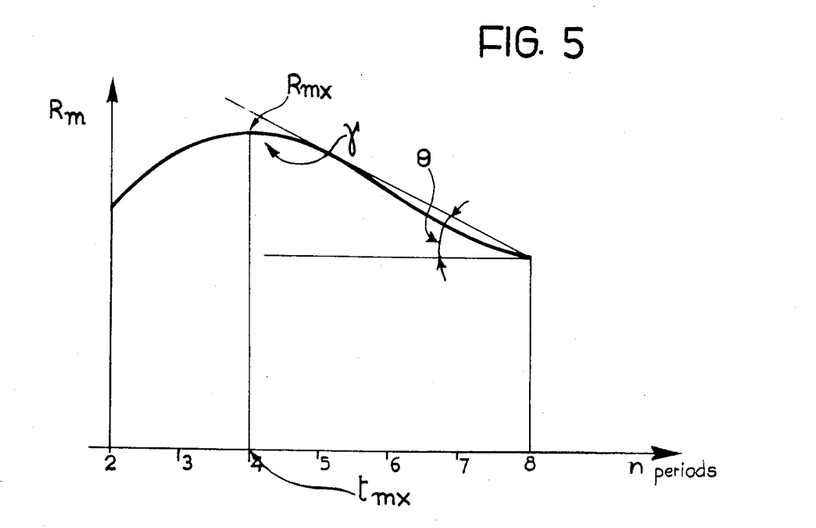
FIG. 5 is a graph illustrating diagrammatically the changes in one of the parameters which regulates the operation of part of the block schematic diagram of FIG. 3.

FIG. 5 illustrates schematically the typical time graph of the resistance $R_m$ between the welding electrodes $E_1$, $E_2$ clamped on the pieces P which are welded, as a function of the number of periods of the welding current in each individual welding operation. The graph of FIG. 5 relates in particular to a typical time graph of the resistance $R_m$ detected during the application of a qualitatively-satisfactory spot weld to uncoated sheets of low-carbon steel.

The circuit A of FIG. 3 (or the variant A' of FIG. 4) generates a value of $R_m$ at the output 28 which is calculated for each period of the current i. The curve shown in FIG. 5 is thus a representation of a succession of discrete values in a continuous form.

From experimental tests, the Applicants have found that there is a correlation between the changes in the resistance $R_m$ between the electrodes $E_1$, $E_2$ clamped on the pieces P during each individual welding operation (the application of one spot) and the qualitative result of this operation.

Observation of the changes in the resistance the electrodes $E_1$, $E_2$ during the welding operation thus make it possible to establish whether the spot applied should be considered acceptable or unacceptable.

In general, each time there is an anomaly in the welding operation which diminishes the current density in the region subjected to welding (the spot), the resistance $R_m$ between the electrodes has a more flattened form than that which is manifested during the application of a good quality spot. The change in the resistance of the spot is influenced by numerous factors such as, for example, the diameter of the electrodes and the load acting thereon, the thickness, composition and surface conditions of the pieces to be welded, the established operating angle of the welding current, the impedance of the secondary winding of the welding transformer, the power of the transformer itself, and the voltage in the mains supply.

More particularly, the applicants have noted that an especially significant discriminating quantity is given by a linear combination G defined by the equation:

$$G = a_1\theta + a_2 R_{mx} + a_3 t_{mx} + a_4\gamma \tag{II}$$

in which:

$\theta$ is the average relative slope of the curve of the resistance $R_m$ between the electrodes $E_1$, $E_2$ measured between the peak and the period which indicates the end of the individual welding operation, $R_{mx}$ is the peak value of the resistance curve, $t_{mx}$ is the time at which the peak occurs, and $\gamma$ represents the curvature of the graph of $R_m$ at the peak value $R_{mx}$.

The curvature $\gamma$ and the time $t_{mx}$ at which the peak resistance $R_{mx}$ occurs may be calculated by a polynomial regression formula (for example by a cubic regression formula) from the values which express the changes in the magnitude $R_m$.

A processing unit, indicated 31, calculates from the sequence of values of the resistance $R_m$ measured between the electrodes $E_1$, $E_2$ generated by the divider circuit 25 the characteristic parameters $\theta$, $R_{mx}$, $t_{mx}$ and $\gamma$. From these parameters a multiplier assembly 32 derives the linear combination G defined by equation (II).

The coefficients of the linear combination G, that is say the multiplying factors $a_1$, $a_2$, $a_3$, $a_4$ which regulate the operation of the multipliers 32, may be set by an external operator through a keyboard 33 provided in the control unit 2.

The linear combination signal generated by the multipliers 32 is then applied to the input of a comparator circuit 34 the threshold level of which may be selected by means of the keyboard 33.

The comparator circuit 34 is then able to carry out a discriminating analysis to establish whether the quality of an individual welding operation (a spot weld) carried out during a predetermined number (for example 8) periods of the welding current i should be considered acceptable or unacceptable. The discriminating analysis is carried out by a comparison of the value of the linear combination G calculated from the equation (II) for each individual welding operation (spot) with the threshold level input in the circuit 34. For example, it is established that, when the value of the linear (discriminating) combination G calculated is less than the threshold value of the circuit 34, the quality of the welding operation should be considered acceptable (a good spot) and that, in the opposite case, the result of the welding operation should be considered unacceptable (a bad spot).

The determination of the coefficients of the linear combination expressed by the equation (II) and the determination of the threshold level of the comparator circuit 34 are carried out on an experimental basis, account being taken of the specific conditions in which the welding operation is carried out. Typically, for greater simplification of the procedure in use, the threshold level of the circuit 34 is determined experimentally during an initial phase of operation of the welding apparatus.

The output of the comparator circuit 34 is connected to the regulating unit S both directly and through a counter circuit 35.

The connection between the comparator circuit 34 and the regulating unit S remains inactive until the result of the comparison (the discriminating analysis) effected within the circuit 34 allows the result of the individual welding operation carried out for a predetermined number (for example 8) periods of the welding current i (to be considered) as acceptable (a good spot).

On the contrary, when the result of the comparison causes one to consider the result as unacceptable (a bad spot), the comparator circuit 34 sends a command signal to the regulating unit S and causes the individual welding operation to be carried out for a certain number (for example 4) of further periods of the welding current i with arms value of the current i increased by about 20% compared with the initial value.

This increased value has been shown to be the optimum from the experimental data obtained by the Applicants: naturally, it is possible to choose different values in dependence on the requirements of use.

In each case, the result of the intervention of the comparator circuit 35 on the regulating unit S is to cause a correction of the spot applied, improving the qualitative result of the welding operation until it is brought to an acceptable level.

After its correcting intervention, the unit S returns the rms value of the welding current i to the original value for a further individual welding operation (spot) to be carried out.

Moreover, the counter circuit 35 detects each correcting intervention and is thus able to establish when the number of correcting interventions carried out reaches an upper limit (for example, an upper value of 3 times the mean square deviation of the number of correcting interventions detected in the presence of new supply cables and welding electrodes) compared with the overall number of individual welding operations carried out in a certain time interval.

When this upper limit is reached, the counter 35 acts on the regulating unit S (as illustrated with reference to FIG. 2) to cause a permanent increase in the rms value of the welding current i equal, for example to 5%. Naturally, an increase different from that indicated may also be chosen in dependence on the requirements of use.

Two statistical processing circuits, indicated 36 and 37, are connected respectively to the outputs of the divider circuits 26 and 27.

Each of the circuits 36 and 37 can process the sequence of resistances $R_m$ calculated from the equation (II) by the divider circuit 26, 27 to which it is connected.

For example, each circuit 36, 37 can calculate the standard deviation $\sigma$ of the resistances $R_m$ of the supply cables $C_1$ and $C_2$ during a learning phase to which the device 1 is subject when new supply cables $C_1$, $C_2$ are fitted to in the welding apparatus.

The signal generated by the divider circuit 26 and the signal generated by the divider circuit 27 are fed to the inputs of respective threshold circuits, indicated 38 and 39, which are structurally similar to the circuit 34.

The threshold levels of the comparator circuits 38 and 39 are fixed by the processing units 36, 37 in dependence on the value of the standard deviation calculated thereby.

Each of the circuits 38, 39 is intended to monitor one of the supply cables $C_1$, $C_2$ and to detect when the resistance between levels the ends of the cable itself reaches the upper threshold level, reducing the efficiency of the welding operation, as a result of the gradual wear of the cable itself.

Normally, the threshold level of each of the circuits 38 and 39 is fixed so as to signal the condition in which the resistances between the ends of the cable $C_1$ (circuit 38) and the ends of the supply cable $C_2$ (circuit 39) become greater than 3 times the mean square deviation calculated by the processing units 36, 37 during the initial learning phase with new cables.

When the resistances between the ends of the cables $C_1$, $C_2$ exceed the threshold levels input to the comparator circuits 38, 39, the comparator circuit itself acts on the regulating unit S to cause a corresponding permanent increase in the rms value in the welding current i.

This increased rms value is obtained, like the increased rms value of the current controlled by the counter 35, through an increase in the duration of the operating periods (welding angle) of the electronic switches D.

The Applicants have found that, as in the case of the attrition of the electrodes $E_1$, $E_2$, the increase in the rms value of the welding current i compensates for the harmful effects which the gradual attrition of the supply cables $C_1$, $C_2$ have on the qualitative result of the welding operation.

Consequently, a complete cycle of welding operations (which normally includes the carrying out of thousands or tens of thousands of individual welding operations) is performed by the initial selection—in the presence of new electrodes $E_1$, $E_2$ and cables $C_1$, $C_2$—of an initial value of the duration of the operating periods (welding angle) of the electronic switches D and a gradual increase in the duration of these periods by successive steps so as to take account of the gradual attrition of the electrodes and the cables. The degree and development of the wear are monitored as they progress, that is, while the apparatus carries out the normal welding operation—the changes in the resistance $R_m$ between the ends of the electrodes $E_1$, $E_2$ clamped on the pieces P which are welded and between the ends of the supply cables $C_1$ and $C_2$ are detected continuously or almost continuously.

The possibility of increasing the rms value of the welding current i by a gradual increase in the duration of the operating periods of the electronic switches D is exhausted when the switches D, as a result of successive interventions, become permanently conductive and cause a continuous supply of welding current through the transformer F.

When this upper operating limit is reached, it is signalled by a warning circuit 40 connected to the regulating unit S₂. The circuit 40 has associated warning members, such as indicator lights, which signal to the operators who are following the operation of the apparatus the need to replace the worn elements.

Preferably, the unit S has separate blocks 41a, 41b and 41c which register selectively the increases in the rms value of the welding current i controlled by the increase in the resistance of the electrodes, and the increases effected by the increase in the resistance of each of the two supply cables C₁, C₂, and compare the number and degree of these increases with respective thresholds levels.

Thus, it is possible to fix separate overall limits for the increases in the rms value of the welding current so as to compensate for the increase in the resistance between the electrodes and for the increase effected to compensate for the increase in the resistance between the ends of each supply cable.

For example, if the cost of the cables C₁, C₂ is considered higher than the cost of the electrodes E₁, E₂, it is preferable to establish that the permitted range of increase in the rms value of the current in dependence on the wear of the cables C₁, C₂ is greater (for example four times) than the permitted range of correcting increase in the effective value of the current in dependence on the wear of the electrodes.

The provision of separate ranges of increase also allows the selective signalling through the circuit 40 of wear of components of the installation. For example, it is possible to provide indicator lights 42, 43 and 44 on the signalling device 40 corresponding respectively to the three distinct blocks 41a, 41b and 41c provided in the unit S.

Each of the lights is activated, signalling to the exterior the need to intervene or replace, when the range of permanent increase in the rms value of the current established for the respective component is exhausted, thus indicating to the operator the need to replace the worn component.

A device has thus been described for controlling electrical resistance welding apparatus, which enables the monitoring of and compensation for the gradual wear of the welding electrodes and the supply cables for the electrodes in a coordinated manner.

Naturally, the principle of the invention remaining the same, the constructional details and forms of embodiment may be varied widely with respect to those described and illustrated, without thereby departing from the scope of the present invention. In particular, the processing functions and calculations carried out by the elements of the calculating circuit 1 may be carried out to advantage by an electronic circuit such as a miniprocessor or a micro-processor programmed for this purpose.

We claim:

1. A device for controlling electrical resistance welding apparatus comprising:
   first and second welding electrodes for cooperating with each other in use, the pieces to be welded being interposed therebetween;
   an electrical power supply having regulating means and able to supply electrical welding currents whose rms value can be regulated by the regulating means, and
   first and second supply cables connecting the electrical power supply to the first electrode and to the second electrode respectively, wherein said device includes:
   first and second voltage detector probes applied to the first welding electrode and the second welding electrode respectively,
   third and fourth voltage detector probes applied respectively to the first supply cable and the second supply cable in the regions of their connection to the electrical power supply;
   a current sensor sensitive to the magnitude of the welding current supplied by the electrical power supply, and
   a processing circuit connected to the first, second, third and fourth voltage detector probes, to the current sensor and to the regulating means of the electrical power supply and which can generate, from voltages detected by the probes and the magnitude of the current detected by the current sensor, signals indicative of the resistances between the first and the second welding electrodes and between the ends of the first and the second supply cables in use of the apparatus, said processing circuit including threshold elements which can compare the signals indicative of the resistances with respective threshold values and can act on the regulating means of the electrical power supply to effect a variation in the rms value of the welding current supplied by the supply itself when at least one of the signals indicative of the resistances reaches the respective threshold value, wherein the electrical power supply includes switch means for supplying periodic welding currents through a given number of periods and wherein said processing circuit includes circuit means for generating the signals indicative of the electrical resistances between the first and the second electrodes and between the ends of the first and the second supply cables at each period of the welding current from resistances calculated by the equation:

$$R_m = \frac{\int_O^T V(t) \cdot i(t)\, dt}{\int_O^T i^2(t)\, dt}$$

where:
$R_m$ is the calculated resistance,
T is the period of the welding current,
i(t) is the instantaneous magnitude of the welding current, and
v(t) is the voltage difference measured between the two voltage detector probes applied respectively to the first and second welding electrodes, to the first welding electrode and to the first supply cable, and to the second welding electrode and to the second supply cable.

2. A device as define claim 1, wherein the processing circuit includes:
   a unit for calculating the electrical resistance between the first and the second welding electrodes, which can calculate respective resistances for each period of the welding current, and
   a comparator unit which can compare the sequence of resistances between the welding electrodes calculated during each welding operation with a set of reference values, and which can act on the regulating means of the electrical power supply when the sequence of calculated resistances departs from the set of reference values in order to continue the welding operation over a predetermined number of periods of the welding current with an increase in the rms value of the welding current itself.

3. A device as defined in claim 2, wherein the calculating unit generates, from the sequence of resistances calculated, a linear combination of signals indicative of the following quantities:

the maximum resistance measured during the welding operation, the instant at which this value is reached, the curvature of the sequence at the maximum value, and average relative slope between the maximum value and the last resistance of the sequence, and wherein the comparator unit compares the linear combination with a respective reference combination value.

* * * * *